United States Patent
Cheaz et al.

(10) Patent No.: US 11,042,622 B2
(45) Date of Patent: Jun. 22, 2021

(54) AUTHENTICATING USERS AND IMPROVING VIRTUAL REALITY EXPERIENCES VIA OCULAR SCANS AND PUPILLOMETRY

(71) Applicant: INTERNATIONAL BUSINESS MACHINES CORPORATION, Armonk, NY (US)

(72) Inventors: Nixon Cheaz, Cary, NC (US); Anthony M. Diaz, Cary, NC (US); Michael E. Head, Cary, NC (US); Jordana H. Kerr, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/508,909

(22) Filed: Jul. 11, 2019

(65) Prior Publication Data

US 2019/0340345 A1 Nov. 7, 2019

Related U.S. Application Data

(63) Continuation of application No. 15/588,808, filed on May 8, 2017, now Pat. No. 10,386,923.

(51) Int. Cl.
*G09G 5/00* (2006.01)
*G06F 21/32* (2013.01)
(Continued)

(52) U.S. Cl.
CPC .............. *G06F 21/32* (2013.01); *G06F 3/011* (2013.01); *G06F 3/015* (2013.01); *G06F 21/83* (2013.01); *G06F 2221/2117* (2013.01)

(58) Field of Classification Search
CPC . G06F 3/01; G06F 3/011; G06F 3/013; G06F 3/015; G06F 21/30; G06F 21/32; G06F 21/38; A61B 3/14
See application file for complete search history.

(56) References Cited

U.S. PATENT DOCUMENTS 8,348,429 B2  1/2013 Walsh et al.
8,433,105 B2  4/2013 Choi et al.
(Continued)

FOREIGN PATENT DOCUMENTS

CN    103853956 A    6/2014
WO    2015175681 A1    11/2015
(Continued)

OTHER PUBLICATIONS

Fong, "The Meaning of Pupil Dilation", The Scientist Magazine, http://www.the-scientist.com/?articles.view/articleNo/33563/title/The-Meaning-of-Pupil-Dilation/, Dec. 6, 2012, printed on Feb. 14, 2017, pp. 1-5.

(Continued)

*Primary Examiner* — Joe H Cheng
(74) *Attorney, Agent, or Firm* — Robert D. Bean

(57) ABSTRACT

Embodiments of the present invention are directed to a method, computer system, and computer program product for biometric-enhanced virtual reality experience modification. One or more ocular scans of a user are conducted using a sensor, wherein at least one scan within the one or more conducted ocular scans is a pupil scan. A plurality of pupillometry data is associated with the user based on the one or more conducted ocular scans. A plurality of user information is inferred by the plurality of gathered pupillometry data. The virtual environment is modified based on the plurality of inferred information.

14 Claims, 5 Drawing Sheets

(51) Int. Cl.
  *G06F 3/01* (2006.01)
  *G06F 21/83* (2013.01)

(56) References Cited

U.S. PATENT DOCUMENTS

| | | | |
|---|---|---|---|
| 8,879,801 | B2 | 11/2014 | Ragland |
| 10,241,576 | B2 | 3/2019 | Cheaz et al. |
| 2006/0110008 | A1 | 5/2006 | Vertegaal et al. |
| 2010/0149073 | A1 | 6/2010 | Chaum et al. |
| 2013/0266925 | A1 | 10/2013 | Nunamaker, Jr. et al. |
| 2013/0278899 | A1 | 10/2013 | Waldorf et al. |
| 2014/0098137 | A1 | 4/2014 | Fein et al. |
| 2014/0278914 | A1 | 9/2014 | Gurumoorthy et al. |
| 2015/0085253 | A1 | 3/2015 | Walsh et al. |
| 2015/0099946 | A1 | 4/2015 | Sahin |
| 2015/0223731 | A1 | 8/2015 | Sahin |
| 2015/0243099 | A1 | 8/2015 | Schowengerdt |
| 2015/0381932 | A1 | 12/2015 | Louchheim et al. |
| 2016/0035132 | A1* | 2/2016 | Shuster ............... G06T 19/006 345/633 |
| 2016/0242642 | A1 | 8/2016 | Migliaccio et al. |
| 2016/0262608 | A1 | 9/2016 | Krueger |
| 2016/0270656 | A1 | 9/2016 | Samec et al. |
| 2017/0109513 | A1 | 4/2017 | Skogo et al. |
| 2017/0148214 | A1 | 5/2017 | Muniz-Simas et al. |
| 2017/0346817 | A1 | 11/2017 | Gordon et al. |
| 2017/0358141 | A1 | 12/2017 | Stafford et al. |
| 2018/0136486 | A1 | 5/2018 | McNamara et al. |
| 2018/0164535 | A1 | 6/2018 | Brown |
| 2018/0225127 | A1 | 9/2018 | Nulman |
| 2018/0255335 | A1* | 9/2018 | George ............... H04N 21/4665 |
| 2018/0321743 | A1 | 11/2018 | Cheaz et al. |
| 2019/0108453 | A1* | 4/2019 | Schwabe ............... G06N 5/047 |
| 2019/0370650 | A1* | 12/2019 | Wheeler ............... G06N 5/02 |

FOREIGN PATENT DOCUMENTS

| | | |
|---|---|---|
| WO | 2016029232 A2 | 2/2016 |
| WO | 2016145443 A1 | 9/2016 |

OTHER PUBLICATIONS

Mo, "Neurophilosophy: Your eyes betray the timing of your decisions", ScienceBlogs LLC, http://scienceblogs.com/neurophilosophy/2010/02/18/your-eyes-betray-the-timing-of-your-decisions/, Feb. 18, 2010, printed on Feb. 14, 2017, pp. 1-8.

Fong, "Eye-Opener: Why Do Pupils Dilate in Response to Emotional States?", Scientific American, A Division of Nature America, Inc., https://www.scientificamerican.com/article/eye-opener-why-do-pupils-dialate/, Dec. 7, 2012, printed on Feb. 14, 2017, pp. 1-12.

Psyblog, "Dilated Pupils: 10 Messages My Eyes are Sending You", Spring.org, http://www.spring.org.uk/2011/12/what-the-eyes-reveal-10-messages-my-pupils-are-sending-you.php, Published Dec. 15, 2011, printed on Feb. 14, 2017, pp. 1-13.

Wikipedia, "Pupillary Response", https://en.wikipedia.org/wiki/Pupillary_response, printed Feb. 14, 2017, pp. 1-3.

Purcher, "A Samsung Patent Comes to Light Illustrating a New Multi-Camera Iris Recognition System", http://www.patentlyapple.com/patently-apple/2016/06/a-samsung-patent-comes-to-light-illustrating-a-new-multi-camera-iris-recognition-system.html, posted on Jun. 26, 2016, printed Feb. 14, 2017, pp. 1-6.

Dunn, "Samsung Galaxy S8 Rumors, Specs, Features, Concept, Price, Preorder, Release Date Info", http://galaxys8info.com/, Aug. 3, 2015, printed Feb. 14, 2017, pp. 1-21.

Constine, "Facebook's $2 Billion Acquisition of Oculus Closes, Now Official", https://techcrunch.com/2014/07/21/facebooks-acquisition-of-oculus-closes-now-official/, Jul. 21, 2014, printed Feb. 14, 2017, pp. 1-9.

TechPlanet, "Iris recognition and retina scanning. Are they the same?", http://www.bytechplanet.com/blog/iris-recognition-vs-retina-scanning/, Copyright 2010 by Techdesign S.L., printed Feb. 14, 2017, pp. 1-5.

Dutt, "Samsung explains how the Galaxy Note 7 iris scanner works", Android Authority, http://www.androidauthority.com/samsung-explains-note-7-iris-scanner-707865/, Aug. 4, 2016, printed Feb. 14, 2017, pp. 1-5.

Wikipedia, "Blind spot (vision)", https://en.wikipedia.org/wiki/Blind_spot_(vision), printed Mar. 1, 2017, pp. 1-3.

Wikipedia, "Retinal scan", https://en.wikipedia.org/wiki/Retinal_scan, printed Feb. 14, 2017, pp. 1-4.

Mell et al., "The NIST Definition of Cloud Computing," National Institute of Standards and Technology, Sep. 2011, p. 1-3, Special Publication 800-145.

IBM: List of IBM Patents or Patent Applications Treated As Related (Appendix P), Jul. 11, 2019, pp. 1-2.

* cited by examiner

AUTHENTICATING USERS AND IMPROVING VIRTUAL REALITY EXPERIENCES VIA OCULAR SCANS AND PUPILLOMETRY

This application is a continuation of U.S. application Ser. No. 15/588,808 filed May 8, 2017, now U.S. Pat. No. 10,386,923 B2, the disclosure of which is incorporated herein in its entirety by reference.

BACKGROUND

The present invention relates, generally, to the field of computing, and more particularly to the field of virtual reality.

Virtual reality (VR) is a modern computing technology that uses software to generate images, sounds, haptic feedback, and other sensations to replicate a real environment and to provide a user with complete sensory immersion within this environment. While this immersion in a virtual environment can be achieved with general-purpose computing devices, such as cell phones, more specialized equipment is also used, typically in the form of a headset including head-mounted goggles with a screen in front of the eyes. VR headsets are often supplemented with speakers or headphones to provide audio functionality.

SUMMARY

Embodiments of the present invention are directed to a method, computer system, and computer program product for biometric-enhanced virtual reality experience modification. One or more ocular scans of a user are conducted using a sensor, wherein at least one scan within the one or more conducted ocular scans is a pupil scan. A plurality of pupillometry data is associated with the user based on the one or more conducted ocular scans. A plurality of user information is inferred by the plurality of gathered pupillometry data. The virtual environment is modified based on the plurality of inferred information.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
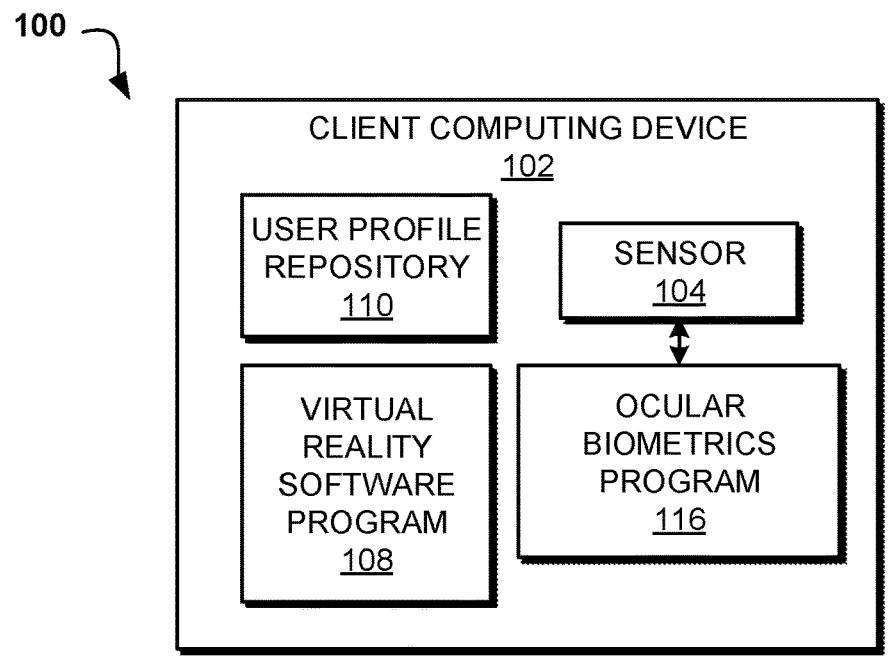
FIG. 1 illustrates an exemplary computer environment according to at least one embodiment.

Detailed embodiments of the claimed structures and methods are disclosed herein; however, the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the field of virtual reality (VR). The following described exemplary embodiments provide a system, method, and program product to, among other things, collect and utilize ocular scans to authenticate users, infer information about the user, and to augment the VR experience. Therefore, the present embodiment has the capacity to improve the technical field of VR by passively authenticating the user without breaking the user's immersion in a virtual environment, by inferring useful information about the user. The user's immersion and experience in a virtual environment may be enhanced through the implementation of pupillometry.

As previously described, VR is a modern computing technology that uses software to generate images, sounds, haptic feedback, and other sensations to replicate a real environment and to provide a user with complete sensory immersion within this environment. While this immersion in a virtual environment can be achieved with general-purpose computing devices such as cell phones, more specialized equipment is also used, typically in the form of a headset comprising head-mounted goggles with a screen in front of the eyes. VR headsets are often supplemented with speakers or headphones to provide audio functionality.

VR is being developed for application in a vast array of different fields, including gaming, military training, engineering, archaeology, architectural and urban design, therapy, marketing, exercise, music, retail, and many more. The goal of most VR simulators is to create an immersive and enjoyable an experience for the user. However, in VR simulations where the user is performing a task, such as a game, the user's experience may be marred if the difficulty of the task is not appropriate to the user's aptitude. If the task is too easy, the user may find the experience boring. If the task is too difficult, the user may find the experience frustrating. Furthermore, the engagement of a user is important; successful VR programs are often those that can keep their users engaged throughout the experience. Those that fail to keep the user engaged are unlikely to be successful. Feedback on whether the user is engaged, and what specific portions of the experience are the most engaging, may be helpful to developers in crafting successful VR experiences. Furthermore, real-time feedback can be used in VR experiences to de-emphasize aspects of the experience that the user finds to be less engaging, and can optimize the VR experience to keep the user maximally engaged. The ability to predict the actions of the user is highly desirable in VR, as it has the potential to create a uniquely immersive experience and enhance the gameplay of a game.

Currently, difficulty is changed in VR programs and games by navigating to a menu, selecting the desired difficulty, and exiting out of the menu. This breaks the flow and immersion of the VR experience. Furthermore, difficulty frequently cannot be changed in a program during play, and can only be changed from the main menu after quitting out of the VR game or experience. Additionally, only three or four difficulty levels are typically offered; this lack of granularity in difficulty levels can result in a lack of difficulty options that match with the aptitude of a particular user.

In the field of VR, there are currently few ways to measure a user's engagement with the VR experience in real time. Developers mainly rely on written or oral feedback from users in focus testing, interviews, and questionnaires, the quality of which can be degraded by the user's forgetfulness, mental bias, brevity, or any number of other factors. This can be an obstacle to developers in identifying and improving elements of the VR experience that users find to be less engaging, and identifying more engaging elements as positive examples to emulate. Furthermore, the art is largely devoid of ways to incorporate this feedback into a game as it is being played, making changes to the experience on the fly in order to customize the experience to the user's taste in real time. Lastly, there are few, if any, methods in the art to predict a VR user's decisions in advance; this technology has the potential to greatly enhance the user's immersion, creating a predictive element that opens up new gaming possibilities. As such, it may be advantageous to, among other things, implement a VR system that provides granular and dynamic difficulty switching based on the user's level of stress, provides real-time, or near real-time, feedback on user engagement with the VR experience, and predicts the user's decisions in order to enhance gameplay and immersion.

According to one embodiment, the biometric-enhanced virtual reality process may utilize an eye scanning camera mounted to a VR headset to perform both authentication scans and pupil dilation measurements. Authentication scans may be used to authenticate the user. The eye scanning camera may also perform regular scans of the user's pupils in order to measure their dilation. From the pupil measurements, a software program may extrapolate factors, such as the mental strain level of the user, elements of the user's decision making process (including when the user has made a decision or given up on solving the problem), engagement of the user in the VR experience, and other information about the user. The extrapolated factors may be used to enhance the VR experience by de-emphasizing aspects of the experience that are of low interest to the user, customize the environment and difficulty in response to the user's stress levels, and modify elements, such as dialogue and gameplay, in response to the user's decisions before the user has acted upon those decisions.

Referring to FIG. 1, an exemplary computer environment 100 is depicted, according to at least one embodiment. The computer environment 100 may include client computing device 102. It may be appreciated that FIG. 1 provides only an illustration of one implementation and does not imply any limitations with regard to the environments in which different embodiments may be implemented. Many modifications to the depicted environments may be made based on design and implementation requirements. For instance, the computer environment 100 may also include a network and remote devices in communication with client computing device 102.

Client computing device 102 represents a device that hosts the VR program, and allows a user to execute the program and interact with the VR environment. Client computing device 102 may include a sensor 104, a VR software program 108, an ocular biometrics program 116, and a user profile repository 110, in accordance with one embodiment of the invention. VR software program 108 may be a game or program that creates a VR environment. In at least one embodiment, VR program 108 may an augmented reality program. Sensor 104 may be any sensor capable of taking optical or infrared scans of the user's eye, such as an optical or infrared camera, and may be capable of performing a pupil scan, as well as a variety of other ocular scans, such as retinal scans and iris scans. Sensor 104 may be incorporated into client computing device 102, for example as a camera located in a VR headset, placed for instance in the blind spot within human vision, or as a camera incorporated into a cell phone that is inserted into a headset to create a VR system. In an alternative embodiment, sensor 104 may be capable of communicating with client computing device 102 over a network. For example, over a near field communication network such as Bluetooth, over an infrastructure network such as a cellular service, or over a cable. Client computing device 102 may be, for example, a mobile device, a telephone, a VR headset, a personal digital assistant, a netbook, a laptop computer, a tablet computer, a desktop computer, or any type of computing device capable of running a program, and accessing a network, in accordance with an embodiment of the invention. As will be discussed with reference to FIG. 3, the client computing device 102 may include internal components 302a and external components 304a, respectively.

User profile repository 110 represents a data repository where user profiles are stored. User profiles are individual accounts which are associated with user information and tied to a unique authentication scan. This user information may include ocular scans gathered by sensor 104 and additional information gathered therefrom, such as pupillometry data and retinal scans. Each user profile may also include user information entered by the user, such as favorite color, birthdate, or profile picture. The user information may also include that communicated over a network originating from other computing devices on the network or from the internet, such as from a social media profile or remote user database. Additionally, in some embodiments of the invention, certain user profiles may be assigned special privileges; for instance, where a user profile belongs to the owner of client computing device 102, that user profile may be granted special privileges beyond that of other user profiles, such as the ability to alter program settings inaccessible to other users or to modify the access or alter the content of other user profiles. An example of this would be where a parent wished to restrict access to the client computing device 102 of the user profiles of his/her children to certain times of day.

According to the present embodiment, the ocular biometrics program 116 may be a program capable of processing ocular scans to identify a user, and may also be capable of processing ocular scans of the pupil to determine pupil dilation in real time. Ocular biometrics program 116 may further be capable of communicating with or affecting VR software program 108 in order to modify the VR experience. The biometric-enhanced VR method is explained in further detail below with respect to FIG. 2.

Figure 2:
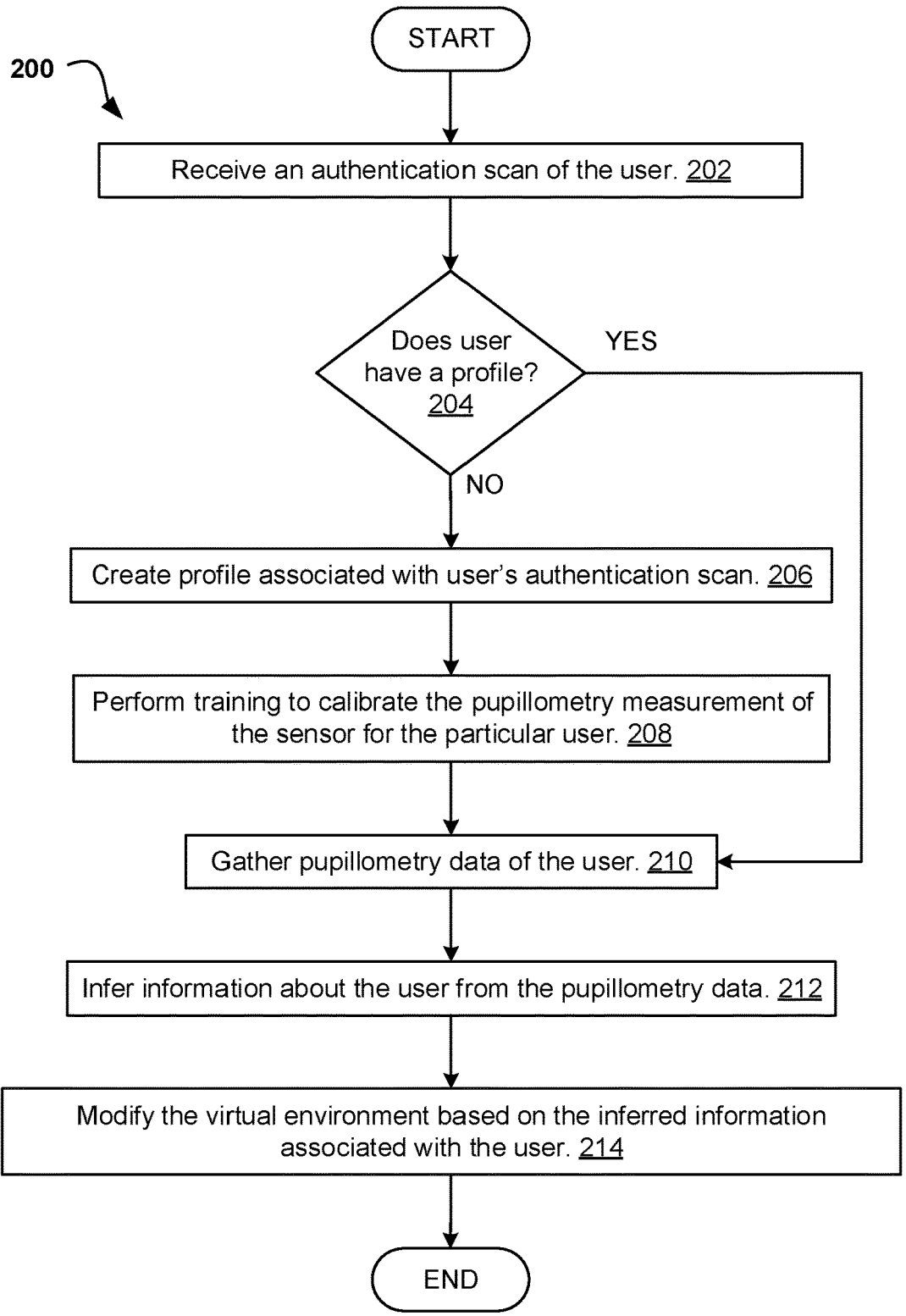
FIG. 2 is an operational flowchart illustrating a biometric-enhanced virtual reality process according to at least one embodiment.

Referring now to FIG. 2, an operational flowchart illustrating a biometric-enhanced VR process 200 is depicted according to at least one embodiment. At 202, the ocular biometrics program 116 conducts an authentication scan of the user. The ocular biometrics program 116 may communicate with sensor 104 to perform the authentication scan of the user. This authentication scan may be one of several types of scans capable of authenticating a user based on unique traits of the user's eye, such as a retinal scan or an iris scan. The authentication scan may be performed at regular intervals while the client computing device 102 is on, in order to automatically detect a change in user, authenticate the new user, and create a new profile or switch to an existing profile. The authentication scan may also be performed only when a potential change in user is detected, for instance by using sensor 104 to detect light levels in a VR headset.

Next, at 204, the ocular biometrics program 116 determines whether the user has a profile. The ocular biometrics program 116 determines whether the user has a profile by checking whether the received authentication scan corresponds to an extant authentication scan associated with a user profile contained within user profile repository 110. According to one implementation, if the ocular biometrics program 116 determines the received authentication scan does correspond to a user profile in user profile repository 110 (step 204, "YES" branch), the ocular biometrics program 116 may continue to step 210 to gather pupillometry data on the user. If the ocular biometrics program 116 determines the received authentication scan does not match with an existing user profile stored in user profile repository 110 (step 204, "NO" branch), the ocular biometrics program 116 may advance to step 206 to create a user profile associated with the received authentication scan. The user may optionally configure ocular biometrics program 116 to terminate or restrict a user's access to client computing device 102 if the authentication scan does not correspond with any existing user profile in user profile repository 110.

Then, at 206, ocular biometrics program 116 creates a user profile in user profile repository 110 associated with the received authentication scan. This step may be performed automatically, without input from the user. The ocular biometrics program 116 may additionally prompt the user for supplemental information with which to augment the user profile, such as name, age, and preferred settings. In addition, the ocular biometrics program 116 may supplement the information contained in the user profile with information uploaded from a network. The user profile repository 110 may be located on client computing device 102, or any other data storage device in communication with the ocular biometrics program 116.

Next, at 208, the ocular biometrics program 116 conducts training to calibrate the pupillometry measurements for a particular user profile in user profile repository 110. This training step may entail showing the user a series of images where the light levels are pre-set, and measuring the effect these light levels have on the user's pupils, in order to establish a baseline value for pupil width and latency against which future measurements can be compared, and to better distinguish the effects of light from the effects of VR-induced brain activity. The images may be shown as part of a discrete training activity that is performed either automatically or at the option of the user, or may be integrated into the boot sequence of client computing device 102 or the opening sequence of VR software program 108 or ocular biometrics program 116. The training step may also take pupil scans and compare the pupil scans against stored pupil scans in the user's profile or in the profiles of other users in order to better distinguish the effects of VR-induced brain activity from external factors, such as age, sleepiness, and anxiety originating from outside the VR environment. This training may be conducted only once, after the creation of the user profile; alternatively, the training may also be conducted whenever a user begins using the headset, or the training may be conducted at regular or continuous intervals throughout the VR experience.

Then, at 210, the ocular biometrics program 116 gathers pupillometry data of the user by using sensor 104 to conduct pupil scans of the user. The pupil scans may be attached to the corresponding user profile in user profile repository 110. The pupil scans may be performed at regular intervals, and may be spaced according to the computing resources of the client computing device 102 running ocular biometrics program 116, and/or may be spaced according to the informational priorities of ocular biometrics program 116; for instance, for real-time or near-real-time feedback on user engagement, pupil scans should be performed with a high frequency, such as once per second or more. If ocular biometrics program 116 is using the pupil scans to anticipate the user's decision making to produce a predictive element, pupil scans must be performed at an extremely high frequency, for instance every tenth of a second or more. For other uses, such as inferring engagement, a lower frequency of pupil scanning may suffice. For still other uses, such as inferring age or sleepiness, constant scanning may not be necessary, but short intervals of high-frequency scanning may employed instead. In an alternative embodiment, ocular biometrics program 116 gathers pupillometry data of the user by processing pupil scans taken previously and stored in a repository on or in communication with client computing device 102.

Next, at 212, the ocular biometrics program 116 infers information about the user. This inferred information may include such information as the engagement of the user during the VR experience, the age of the user, the sleepiness of the user, the decision making processes of the user, the anxiety level of the user, and more. User engagement, decision-processes, and anxiety of the user may be inferred from changes in the dilation of the pupils in response to stimuli, such as stimuli from VR software program 108. Information such as age and sleepiness of the user may be inferred from the latency of the pupillary response to stimuli, such as stimuli from VR software program 108. This information may be associated with the user profile, or may be stored anonymously in a repository on or in communication with client computing device 102. As an example, information on the engagement of the user during the VR experience may be stored anonymously and communicated with the developers of the VR software program 108, in order to aid the developers in optimizing current and/or future VR experiences for maximum user engagement.

Then, at 214, the ocular biometrics program 116 modifies the virtual environment of VR software program 108 based on the inferred information. This modification of the virtual environment may be in response to a variety of aspects of the user's experience, including inferred information such as the user's level of anxiety, decision-making processes, and level of engagement. Additionally, the modification of the virtual environment may be in response to the intended user experience of VR software program 108; this may include such factors as the desired atmosphere, emotional arc of the story, and intended ease of play of VR software program 108. For instance, if the user is experiencing high anxiety, and VR software program 108 is a lighthearted adventure game intended to be a relaxing experience, ocular biometrics program 116 may modify the virtual environment of VR software program 108 to be less difficult for the user, change the virtual environment to be more calming, or change dialogue of characters to acknowledge the user's anxiety. Conversely, if the user is experiencing low anxiety, and VR software program 108 is a horror game intended to frighten and stress the user, the virtual environment may be altered to increase the difficulty, may be visually altered to be more frightening, or may alter dialogue to further frighten the user. The modification of the virtual environment may also be tied to the user's engagement in the VR experience; for instance, elements of the VR experience that produce low engagement for the user may be de-emphasized in favor of elements that produce high engagement. Additionally, the virtual environment may be tied to the decision-making process of the user, in order to produce a mind-reading effect; as an example, if the user is tasked with solving a puzzle, ocular biometrics program 116 may monitor the decision making process of the user to determine when the user has solved or given up on solving the puzzle, at which point VR software program 108 may use visual or audio cues to offer hints to the player. Additionally, dialogue or actions by characters in the virtual environment may be altered to anticipate the player's decisions.

It may be appreciated that FIG. 2 provides only an illustration of one implementation and does not imply any limitations with regard to how different embodiments may be implemented. Many modifications to the depicted environments may be made based on design and implementation requirements. For instance, in an alternative embodiment, the process may forego the creation of user profiles and authentication scans in favor of a file where pupil scans of the current user of the client computing device 102 are stored, which is deleted or emptied when the user changes or client computing device 102 is shut down.

Figure 3:
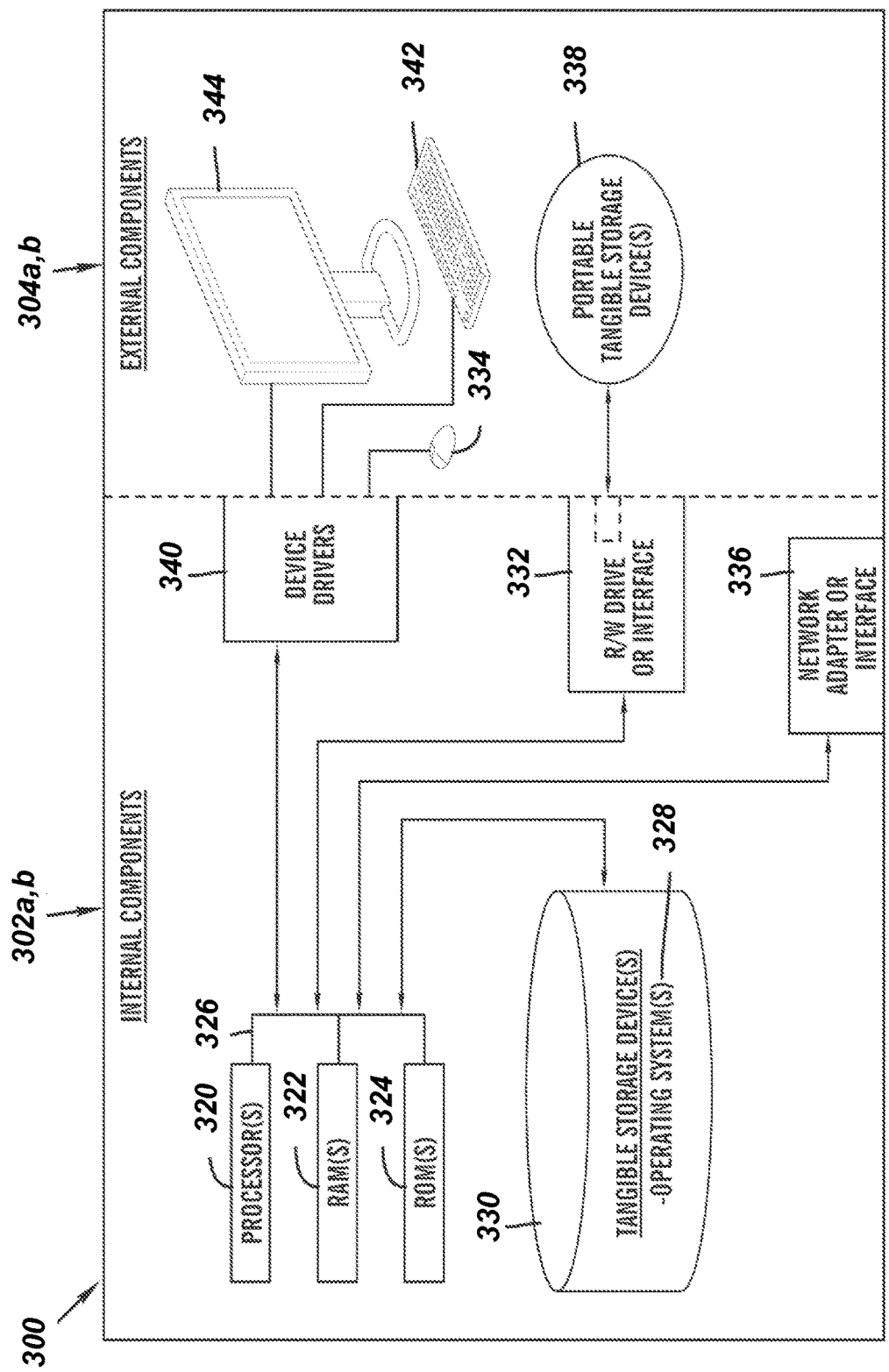
FIG. 3 is a block diagram of internal and external components of computers and servers depicted in FIG. 1 according to at least one embodiment.

FIG. 3 is a block diagram 300 of internal and external components of the client computing device 102 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, VR headsets, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the VR software program 108 and the ocular biometrics program 116 in the client computing device 102 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the ocular biometrics program 116, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The VR software program 108 and the ocular biometrics program 116 in the client computing device 102 can be downloaded to the client computing device 102 from an external computer via a network (for example, the Internet, a local area network or other, wide area network) and respective network adapters or interfaces 336. From the network adapters or interfaces 336, the VR software program 108 and the ocular biometrics program 116 in the client computing device 102 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The present invention may be a system, a method, and/or a computer program product at any possible technical detail level of integration. The computer program product may include a computer readable storage medium (or media) having computer readable program instructions thereon for causing a processor to carry out aspects of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
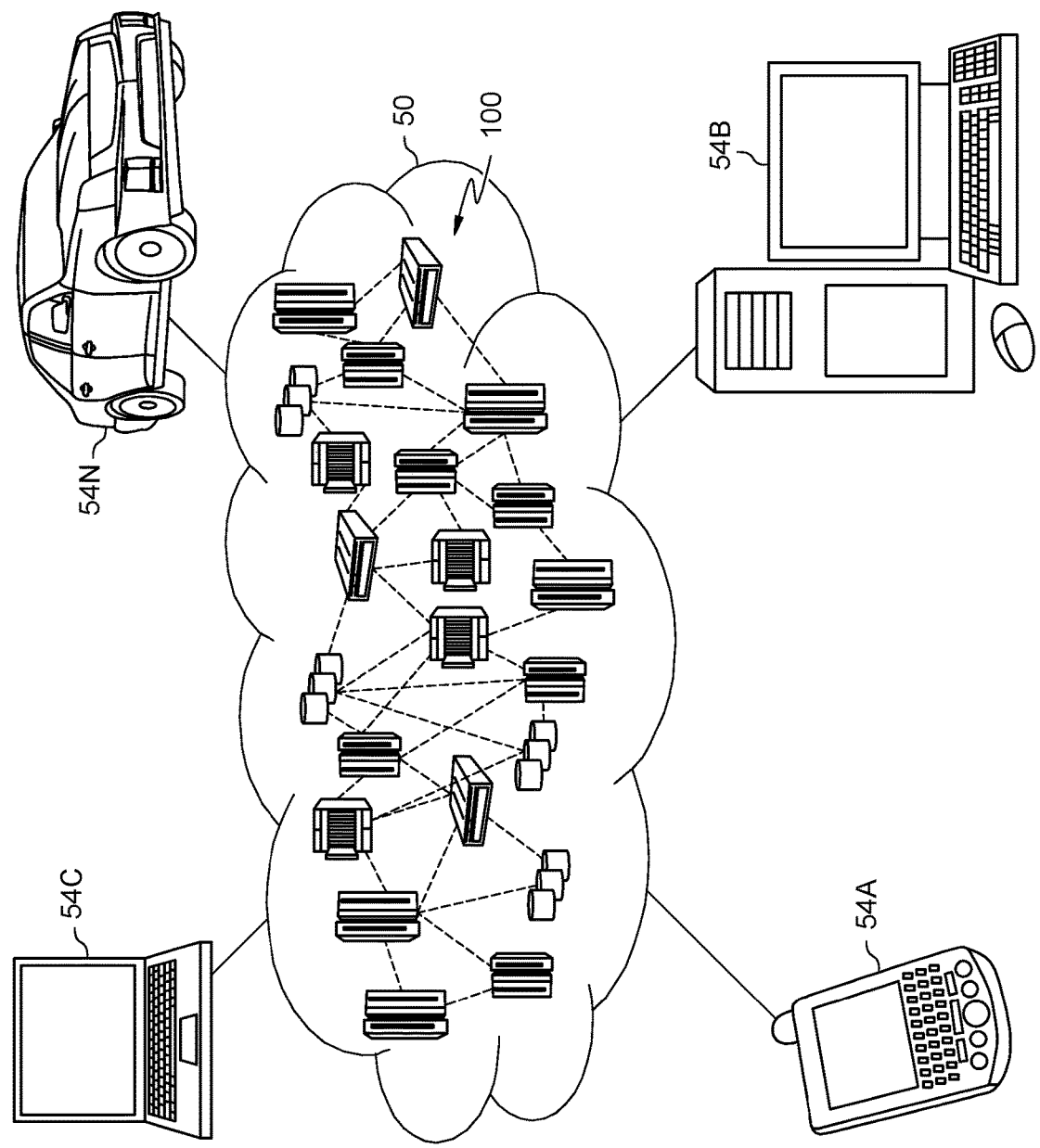
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
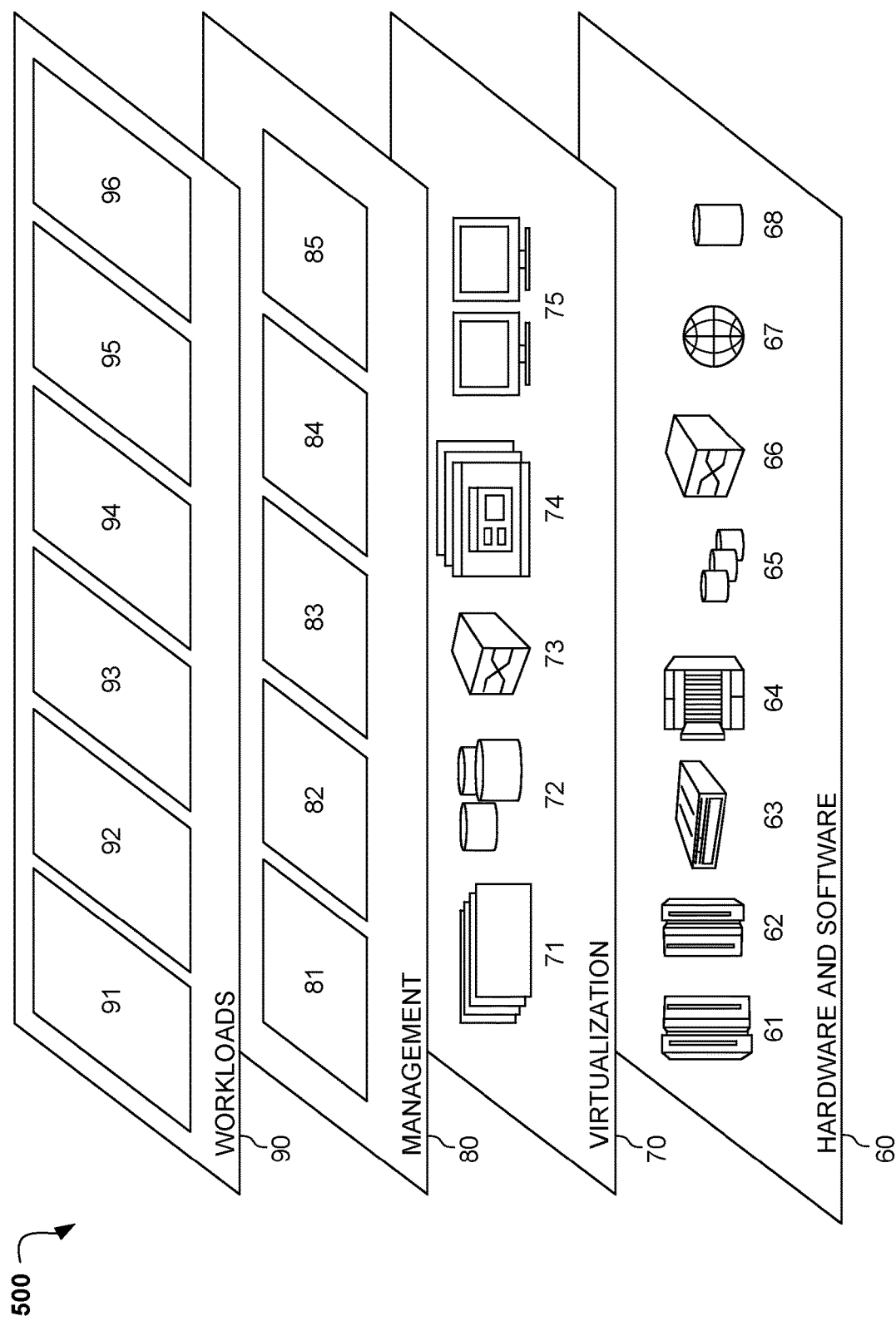
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and biometric-enhanced VR experience modification 96. Biometric-enhanced VR experience modification 96 may relate to utilizing scans of the user's eye to authenticate the user and to alter the user's VR experience based on their mental or physical state as determined via pupillometry.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for biometric-enhanced virtual reality experience modification, the method comprising:
   predicting, by a processor, one or more decisions by a user based on a plurality of pupillometry data; and
   modifying a virtual game environment based on the one or more predicted decisions.

2. The method of claim 1, further comprising the step of:
   training an ocular biometrics program to calibrate a measurement of a sensor for a plurality of individual traits associated with the user.

3. The method of claim 1, further comprising:
   in response to determining a user profile does not exist, creating a user profile comprising the plurality of pupillometry data.

4. The method of claim 1, further comprising:
   inferring, by the processor, a plurality of user information from the plurality of pupillometry data.

5. The method of claim 4, wherein the plurality of inferred information is selected from a group consisting of: an engagement of the user within the virtual environment, an age of the user, a sleepiness of the user, a plurality of decision making processes of the user, and an anxiety level of the user.

6. A system for biometric-enhanced virtual reality experience modification, the system comprising:
   a computer system;
   a sensor operatively coupled to the computer system;
   the sensor operated to collect pupillometry data;
   the computer operated to perform a method comprising:
     predicting, by a processor, one or more decisions by a user based on a plurality of pupillometry data; and
     modifying a virtual game environment based on the one or more predicted decisions.

7. The system of claim 6, further comprising:
   training an ocular biometrics program to calibrate a measurement of the sensor for a plurality of individual traits associated with the user.

8. The system of claim 6, further comprising:
   in response to determining a user profile does not exist, creating a user profile comprising the plurality of pupillometry data.

9. The system of claim 6, further comprising:
   inferring, by the processor, a plurality of user information from the plurality of pupillometry data.

10. The system of claim 9, wherein the plurality of inferred information is selected from a group consisting of: an engagement of the user within the virtual environment, an age of the user, a sleepiness of the user, a plurality of decision-making processes of the user, and an anxiety level of the user.

11. A computer program product for biometric-enhanced virtual reality experience modification, the computer program product comprising:
    one or more computer-readable non-transitory tangible storage medium and program instructions stored on at least one of the one or more non-transitory tangible storage medium, the program instructions being executable by a processor to cause the processor to perform a method comprising:
      predicting, by a processor, one or more decisions by a user based on a plurality of pupillometry data; and
      modifying a virtual game environment based on the one or more predicted decisions.

12. The computer program product of claim 11, further comprising:
    training an ocular biometrics program to calibrate a measurement of the sensor for a plurality of individual traits associated with the user.

13. The computer program product of claim 11, further comprising:
    in response to determining a user profile does not exist, creating a user profile comprising the plurality of pupillometry data.

14. The computer program product of claim 11, wherein modifying the virtual environment further comprises:
    inferring, by the processor, a plurality of user information from the plurality of pupillometry data.

* * * * *